United States Patent [19]

Rösch

[11] 3,786,276

[45] Jan. 15, 1974

[54] INTERFERENCE SUPPRESSION DEVICE FOR LOGIC SIGNALS

[75] Inventor: Eduard Rösch, Le Locle, Switzerland

[73] Assignee: Dixi S.A., Le Locle, Switzerland

[22] Filed: Jan. 7, 1972

[21] Appl. No.: 216,068

[30] Foreign Application Priority Data

Jan. 22, 1971 Switzerland .......... 974/71

[52] U.S. Cl. .......... 307/208, 307/215, 307/247, 307/289, 328/195, 328/201, 328/206

[51] Int. Cl. .......... H03k 19/08, H03k 3/12

[58] Field of Search .......... 307/208, 247 A, 247 R, 307/289, 291, 292, 215; 328/206, 201, 195

[56] References Cited

UNITED STATES PATENTS

| | | | |
|---|---|---|---|
| 3,603,815 | 9/1971 | Rao | 307/292 X |
| 3,603,819 | 9/1971 | Molle | 307/291 |
| 3,609,569 | 9/1971 | Todd | 307/291 X |
| 3,673,434 | 6/1972 | McIntosh | 307/289 X |
| 3,462,613 | 8/1969 | Wolf, Jr. | 307/247 R X |
| 3,588,546 | 6/1971 | Lagemann | 307/291 |
| 3,619,790 | 11/1971 | Brooksbank | 307/247 X |
| 3,624,518 | 11/1971 | Dildy, Jr. | 307/247 A X |

*Primary Examiner*—Stanley D. Miller, Jr.
*Attorney*—Edward T. Connors

[57] ABSTRACT

An interference suppression device for logic signals including two logic units in series with periodically controlled storage of an information signal and later transmission thereof to an output terminal, and at least one regenerating circuit which when supplied with identical information at its inputs switches the units to a definite state thus maintaining an information signal at the output of the suppression circuit.

1 Claim, 2 Drawing Figures

INTERFERENCE SUPPRESSION DEVICE FOR LOGIC SIGNALS

Signals containing logic information are very often accompanied by interference signals. Measures to prevent the formation of such signals, for example by twisting two-core transmission lines, are not always possible and do not necessarily prevent such signals. Undesired operation of a logic circuit to spurious signals have hitherto been avoided by increasing the operating times, operation delays of the order of at least 400 $\times 10^{-9}$ sec. being necessary.

It is an object of the present invention to eliminate interference signals reliably by means of a simple circuit without having to use such long delays.

According to the present invention there is provided a suppression circuit for logic signals, including two logic units in series with periodically controlled storage of an input information signal and subsequent transmission thereof to an output terminal, and at least one regenerating circuit which when supplied with identical information at its inputs switches the units to a definite state, thus maintaining an information signal at the output of the suppression circuit.

Interference signals are prevented from appearing at the output terminals, since a constant regeneration occurs before transmission by the second unit can occur. The delay in operation is determined by the period of the clock signal.

The invention is described in detail below by way of an embodiment.

Figure 1:
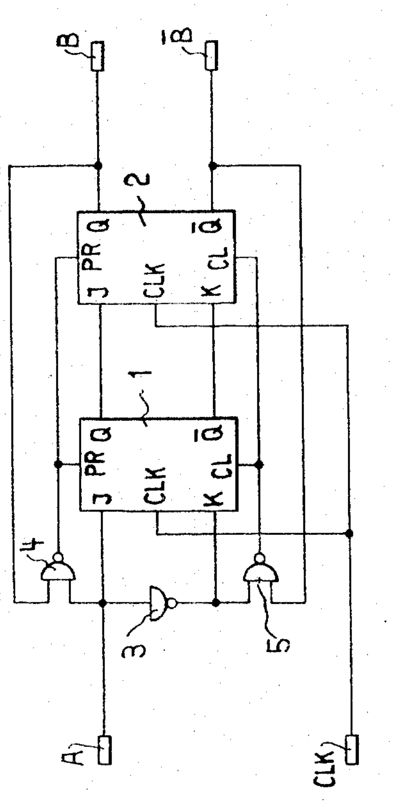
FIG. 1 is a circuit diagram of the suppression circuit.

The input signal arrives at an input terminal A, which is connected to the input J of a first double J-K-Master-Slave flip-flop 1 with asynchronous set and reset inputs. The output Q of this first flip-flop is connected to the input J of a second identical flip-flop 2, the output Q of which is connected to an output terminal B of the suppression circuit. The input terminal A is connected via an inverter 3 to the input K of the flip-flop 1, the complementary output Q of which is connected to the input K of the flip-flop 2. The complementary output $\bar{Q}$ of this second flip-flop is connected to an output terminal $\bar{B}$ of the circuit. The input A is also connected to the one input of a NAND gate 4, the other input of which is connected to the output Q of the flip-flop 2. Its output is connected to the set inputs PR (preset) of both flip-flops. The inputs of a further NAND gate 5 are connected to the input K of the flip-flop 1 and the output $\bar{Q}$ of the flip-flop 2, while its output is connected to the reset inputs CL (clear) of both flip-flops. The clock inputs CLK of both flip-flops are connected to a generator (not shown) which produces a square wave voltage of high frequency with an impulse width of 20 nanosecs (n.s.). This voltage is delivered to terminal CLK (FIG. 1) and is shown as CLK in FIG. 2.

Figure 2:
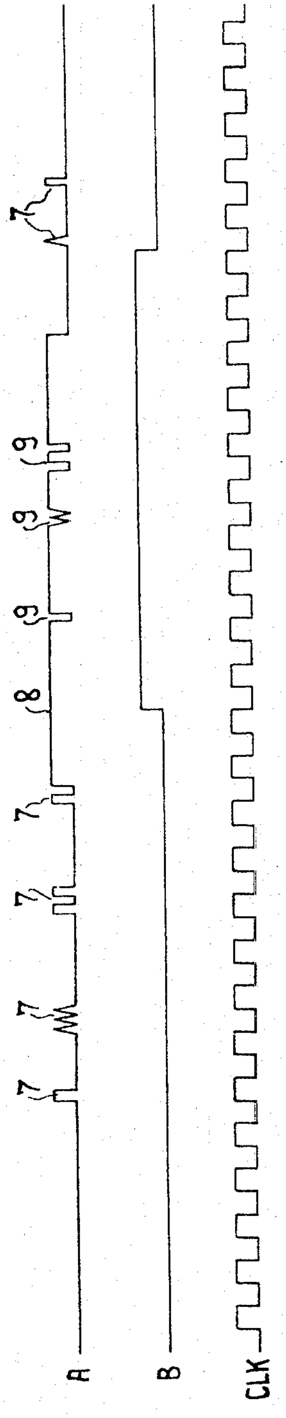
FIG. 2 shows some of the signals occurring in the circuit.

The method of operation of the two double J-K-Master-Slave flip-flops 1 and 2 is known per se and will not be described in detail herein. It is given in the publication "Integrated Circuits" 1969/70, page 29 by Siemens. The state (1) at the inputs PR and CL allows to the outputs Q and $\bar{Q}$ to change their state: the state (0) at one of the inputs PR respectively CL significates that the output $\bar{Q}$ respectively Q is in the state (0). Therefore the inputs PR and CL can not be (0) in the same time, then the outputs Q and $\bar{Q}$ are complementary. On the other hand, only the information present at the input J in the moment where the clock signal at the CLK input goes from (1) to (0) is transmitted, in the same moment to the output Q. As shown in FIG. 2, a signal appears at terminal A which contains a plurality of very short interference impulses 7 and an effective impulse 8 of considerably longer duration. Within the impulse 8 very short interference impulses 9 also occur. This is based on the assumption that the information O occurs at terminal A in the normal state. Hence all inputs J and all outputs Q go to (0) and all inputs K and outputs $\bar{Q}$ remain on (1). The inputs PR are positioned on (1), but are ineffective in this state. The inputs CL are positioned at (0), which confirms the state (0) for the outputs Q.

If a very short interference impulse 7 arrives at the input A when the latter is effective, i.e., during a clock impulse, then in the circumstances this information may be transmitted to the end of the clock impulse at the output Q of the flip-flop 1. The interference impulse, which as such signifies the information (1), causes a reversal of one input of the gate 5 via inverter 3; since the other input remains on information (1), the output becomes (1). The gate 4 output is not reversed, because one of its inputs is on information (0). The interference inpulse can either only be stored in the flip-flop 1, or be transmitted to the Q output of the flip-flop 1 or, if its duration is longer than a half periode of the clock pulse, be stored in the flip-flop 2: at the end of this interference impulse, the output of the gate 5 returns to state (0). The inputs CL of both flip-flops are going to (0) too and erase the informations stored in the flip-flops, if any, and resets, if necessary, the output Q of the flip-flop 1: the impulse is not fed to the output terminal B.

If an impulse 8 of longer duration occurs, then at the end of the first clock impulse the information (1) from the input J and Q of the flip-flop 1 is transmitted from the output Q thereof. A reset does not occur, because the information (1) remains effective at the input terminal A. During the next clock impulse the information (1) is transmitted from the input of the flip-flop 2 to the output and hence to the terminal B. Therefore the information (1) appears at the terminal B and the information 0 at the terminal $\bar{B}$. At the terminal A the information (1) continues with possible short periods of interruption. Thus at both inputs of the gate 4 there appears the information (1) and at the output the information (0), while both inputs of the gate 5 are supplied with information (0) and at its output gives the information (1). The inputs CL are hence ineffective. The inputs PR are now effective and permanently produce the information (1) at output Q and terminal B. The continuous output from B is now unaffected by the interference signals 9, as shown in FIG. 2, this output corresponding to the arriving information. At the end of the input impulse 8, first the flip-flop 1 and at the end of the next clock impulse also flip-flop 2 is reset, so that the output impulse is terminated and the original state is restored.

The circuit shown reliably prevents the transmission of short interference signals and operates at high speed. Transmission is delayed at the most by two clock periods, as for example when the effective impulse arrives at the end of a clock impulse. With a clock period of 40 ns there is thus a maximum delay of 80 ns.

The double clock period is selected to be longer than the duration of interference impulses to be expected, so as to exclude transmission of these impulses by both flip-flops. On the other hand, the duration of useful or signal impulses must exceed twice the clock period.

I claim:

1. An interference suppressing device for logic signals, comprising a first and second J-K-Master-Slave flip-flop having each complementary inputs J and K and complementary outputs Q and Q a clock input CLK and complementary reset inputs $\overline{PR}$ and CL respectively, the output terminals Q and $\overline{Q}$ of said first flip-flop being connected to the inputs J and K respectively of said second flip-flop, an input terminal connected to the input J of said first flip-flop and an inverter connected between said input terminal and the other input K of said first flip-flop, an output terminal connected to the output Q of said second flip-flop, a first NAND-gate having at least two inputs one of said inputs being connected to the input J of said first flip-flop and at least one other input being connected to the corresponding output Q of said second flip-flop, said first NAND-gate having an output connected to the reset inputs PR of said first and second flip-flops, and a second NAND-gate having at least two inputs with one of said inputs being connected to the input K of said first flip-flop and with at least one other input being connected to the corresponding output $\overline{Q}$ of said second flip-flop, said second NAND-gate having an output connected to the reset inputs CL of said first and second flip-flops, and said clock inputs being connected to a source of clock pulses, a time interval equal to twice the period of the clock pulses being selected longer than the maximum expected duration of any interference signal.

* * * * *